June 22, 1971   J. W. GOOCH   3,586,627
PROCESS FOR AGGLOMERATING AND COAGULATING WASTE MATERIAL
Filed Dec. 6, 1968
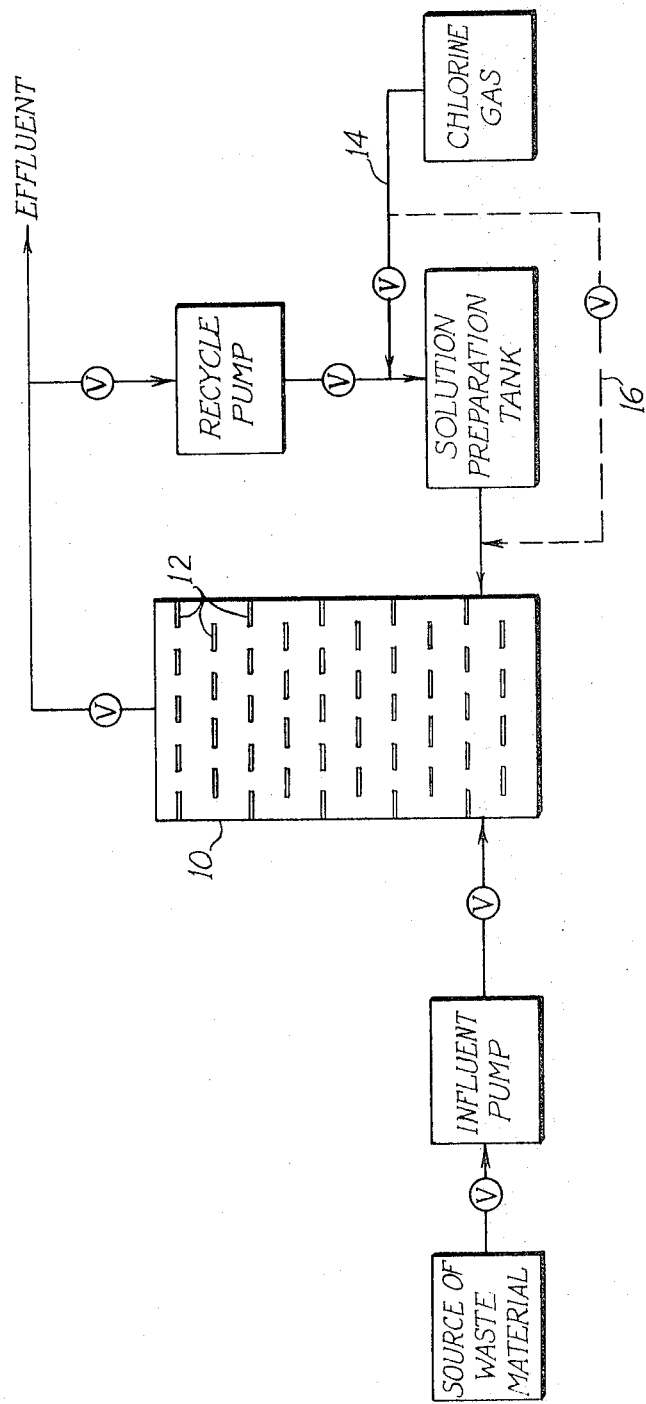
INVENTOR.
Jan W. Gooch
BY Jones & Thomas
ATTORNEYS : 3,586,627
Patented June 22, 1971

3,586,627
PROCESS FOR AGGLOMERATING AND COAGULATING WASTE MATERIAL
Jan W. Gooch, Russellville, Ark., assignor of fractional part interest to Paul P. Paladino and Luther A. Combs, doing business as Sea-Met, Russellville, Ark.
Continuation-in-part of abandoned application Ser. No. 757,224, Aug. 30, 1968, which is a continuation-in-part of application Ser. No. 696,537, Jan. 9, 1968. This application Dec. 6, 1968, Ser. No. 781,840
Int. Cl. B01d 21/01
U.S. Cl. 210—47
15 Claims

ABSTRACT OF THE DISCLOSURE

A process for agglomeration, coagulation and extraction of suspended solids and organic waste materials such as found in the waste effluent streams of packing and rendering plants, paper and pulp mills, food processing plants, and similar facilities. In one embodiment of the invention, the process comprises introducing a reagent solution into the waste stream in such a manner that the reagent is released within the waste stream in the form of a microscopically dispersed gaseous phase which is selectively adsorbed on the surfaces of the suspended solids and organic waste materials to selectively react with the surfaces of the solids and materials and produce surface characteristics which induce agglomeration and coagulation of the solids and materials. A second embodiment comprises electrolytically generating the microscopically dispersed gaseous phase reagent within the waste streams.

CROSS-REFERENCE TO RELATED APPLICATIONS

This application is a continuation-in-part of previously filed copending application Ser. No. 757,224, filed Aug. 30, 1968, and entitled "Improved Extraction Process" which was in turn a continuation-in-part of previously filed copending application Ser. No. 696,537, filed Jan. 9, 1968 and entitled "Extraction Process" both now abandoned.

DISCLOSURE

This invention relates to the agglomeration, coagulation and extraction of suspended solids and organic waste materials from various plant and mill effluent streams, More particularly the invention concerns the generation of dispersed microscopic bubbles of a reagent within a waste material effluent stream so that the reagent may selectively react with the surfaces of suspended solids and waste materials to induce agglomeration and coagulation thereof.

An ever increasing problem has been created by the continued and expanding pollution of streams, rivers, lakes and by-waters. In each instance a plant or mill generates by-product material, organic waste material or conventional sewage during its operation and typically removes the undesirable material by dissolving or dispersing it in a water solution which is flowed as a waste effluent stream to a convenient disposal point such as a stream, river, lake or by-water. Major efforts have been exerted in the past to reduce the degree and extent of pollution caused by these waste effluent streams. Mechanical separation such as skimming, settling, centrifuging and filtering have been successful in removing large undissolved particles. A large amount of dispersed or dissolved solid material or organic waste material of a density approximately equal to that of the carrying solution still remains within the effluent stream, however, after mechanical separation is completed. Various chemical treatments have been proposed to remove the remaining solid or organic waste material. These treatments, though, suffer and have suffered from many disadvantages among which are excessive cost of treating materials and associated equipment; slowness of separation of treated waste material with consequent need for costly treating and settling tanks or basins of large size; inefficiency in removal of very finely divided, suspended and in particular the coagulable or absorbable dissolved solids; and relatively low purity of treated water obtained from the treatment process. These major disadvantages of the conventional chemical methods of treating sewage have prevented the widespread commercial use of such methods, despite the fact that chemical treatment of sewage offers the possibility of very large savings of capital costs in the construction of sewage treatment plants in return for a very small daily outlay for the costs of the necessary treating chemicals.

Therefore it is an object of the present invention to provide an economical and efficient process for agglomeration, coagulation and extraction of solids and waste materials from a plant or mill waste effluent stream. Other objects, features, and advantages of the invention will become apparent from a review of the following detailed description of an embodiment of the invention and the accompanying drawing wherein FIG. 1 schematically represents one process of the invention.

In accordance with the present invention, suspended solids and organic waste materials are agglomerated, coagulated and extracted from waste effluent streams of packing and rendering plants, paper and pulp mills, food processing plants, and other similar mills or industry facilities. Typical waste materials include those which are generally organic in nature such as animal and vegetable tissues including oils, fibers, blood, saccharides, urea, carbohydrates, fats, sugars, fatty acids, cellulose, dyes, and other similar material. Also typically found within a waste effluent stream are human and animal excrement, hard and soft garbage, animal and vegetable organisms, and other biological and mineral products. Those portions of the waste material which exceed the density of the liquid component of the waste stream by a large degree will quickly settle out and may be removed by conventional mechanical separation techniques. In addition, those portions of the waste material which are lighter to a large degree than the liquid component of the waste stream will float to the surface of the stream and may also be easily removed by mechanical separation techniques.

After removal of that portion of the waste material which may be easily removed by mechanical techniques, there remains a large amount of finely divided dispersed, suspended or dissolved waste material of a density closely approximating the density of the liquid component of the stream, usually a water solution. The finely divided material may be economically and efficiently removed from the liquid component by the process of the present invention.

In one embodiment of the invention, a reagent solution is prepared in a metastable form and introduced into the waste stream in such a manner that the reagent is released from the solution within the waste stream in the form of a microscopically dispersed gaseous phase. The reagent, in gaseous phase, is selectively adsorbed on the surfaces of the suspended, dispersed or dissolved waste material to selectively react with the surfaces of the waste material and produce surface characteristics which induce agglomeration and coagulation of the waste material. Upon agglomerating and coagulating, the apparent density of the material is increased by the expulsion of liquid from within the waste material and by the reduction in apparent surface area for the waste material. The agglomerated and coagulated particles of waste material then settle out of the waste material stream and agglomerate and coagulate into large easily removed portions of waste material. Upon the removal of these portions, by decanting, filtration, centrifuging or the like a reasonably clear liquid remains which may be returned to the mill, plant or industrial facility for further use or the liquid may be flowed to and deposited in a river, lake or other by-water without any harmful or objectionable effect thereon provided the original mineral content of the liquid component is acceptable. The waste material may be accumulated, dried and sterilized for further use as fertilizer or animal feed depending on the type of waste material involved. In addition, it should be noted that the extracted waste material is capable of and useful for subsequent and further use as a surface active cationic flocculating agent in the treatment of waste material streams.

Suitable reagents include those compounds or compositions which may be spontaneously released from a liquid media as a gas to become attracted to a particulate surface in the liquid media upon which an activating reaction takes place. Preferred reagents include hydrogen sulfide and oxidizing agents such as halogen compounds, carbon dioxide, sulfur dioxide and ozone. A particularly preferred oxidizing agent is one of the halogen compounds with especially superior results being achieved through the use of gaseous chlorine. In one embodiment, a supply of saturated chlorine solution, for example, saturated chlorine water, is prepared with the solution heated sufficiently to cause the chlorine to become and remain metastable. Temperatures from in excess of 100° C. to about 700° C. have been found to produce suitable results and are recommended for the operation of the process. Superior results have been achieved through the use of a temperature of about 200° C. In addition, the supply of metastable saturated chlorine solution should be maintained in a pressure tight system with an increase in pressure maintained in the system over that pressure which is required to suppress premature release of the chlorine gas. Suitable pressures have ranged up to six atmospheres with superior results being achieved at a pressure of 2 atmospheres.

The metastable saturated chlorine solution is then introduced into the waste material stream which is at a lower temperature and pressure than the chlorine solution. The shock created by this introduction, together with the differential between the pressures of the waste stream and chlorine solution and the reduction in partial pressure of chlorine, causes the chlorine gas to be released throughout the waste stream in a microscopically dispersed gaseous phase, i.e., microbubbles. The microbubbles generally are within the range of 3.72 angstrom units to 0.1 mm. in diameter and because of their small size quickly migrate throughout the waste stream. These microbubbles have a low tendency to coalesce or dissolve in the waste stream and therefore maintain substantially the same size as they travel through the liquid. Further, flow around each bubble is approximately laminar, lessening localized disturbances and mixing.

It is preferable that a short contact time be provided during which the microbubbles may be thoroughly dispersed throughout the waste stream. As such microbubble encounters particulate solid waste material, the bubble of chlorine gas is selectively adsorbed upon the surface of the particulate material to selectively and oxidatively react with the material at that point on the surface. The oxidation reaction produces a chloro compound having a dipole charge at the point of adsorption. The dipole charge is sufficient to create a charged site on the surface thus causing that area of the surface to become a cationic flocculating agent. Thus, surface active cationic flocculating agents are produced in situ from waste material by this process.

The following are examples of reactions which occur at the surface of particulate waste material:

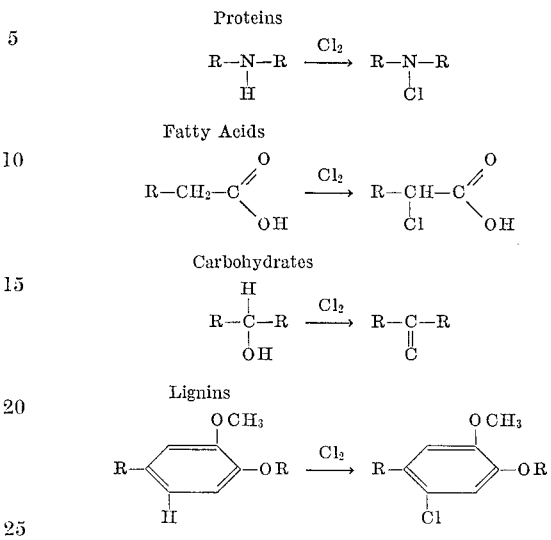

The areas of cationic flocculating agents cause the waste material to agglomerate and coagulate. As previously disclosed, the agglomerated and coagulated waste material then settles out of solution and is easily removed by conventional mechanical separation.

Referring now more particularly to the drawing, it may be seen that the figure is a schematic diagram representing one waste removal system within the scope of the present invention. In this schematic diagram of the process, liquid influent from a source of waste material is pumped by an influent pump through a valve to the bottom of dispersion tank 10. Also entering the bottom of the dispersion tank is a metastable saturated chlorine water solution. The chlorine water solution is prepared by combining chlorine gas with a heated water solution within a solution preparation tank. The temperature of the chlorine saturated water solution should be maintained at a level sufficient to cause the chlorine to be metastable. A suitable temperature for a water solution is 200° C. The chlorine gas is admitted to the solution preparation tank under pressure and an increase in pressure over the pressure required to repress release of the chlorine gas is maintained within the tank, suitably 2 atmospheres. As the heated metastable chlorine water solution is introduced into the bottom of the dispersion tank, the chlorine gas is released from the solution in the form of microbubbles. Foraminous baffles 12 within the dispersion tank assist dispersion of the microbubbles throughout the waste material influent. In addition, the baffles cause the waste material influent together with the generated microbubbles to follow a tortuous path through the dispersion tank and establish a contact period between waste material and bubbles during which the microbubbles can be adsorbed on the particulate surfaces. Other equipment may be used in place of the baffles to assist the dispersion of the microbubbles if so desired.

From the top of the dispersion tank, water solution and coagulated and agglomerated waste material flow as an effluent through a valve to a separation station where the waste material may be easily and efficiently separated from the water solution by conventional mechanical techniques. As shown in the diagram, make-up water solution for use in preparing the saturated chlorine water solution may be withdrawn from the effluent and pumped by an effluent recycle pump to the solution preparation tank. The chlorine gas, as shown by the solid line 14 and the dotted line 16 may be added to the water solution either before or after heating of the water solution within the solution preparation tank.

A suitable range for amount of reagent to waste-material is 1:100 to about 1:1. Preferably the ratio ranges from about 1:50 to about 1:15; and particularly superior results are achieved when the ratio is about 1:30. It should also be noted that as the concentration of waste within the waste stream increases, the amount of reagent required for agglomeration and coagulation of the waste decreases until the ratio becomes approximately 1 pound of chlorine to about 100 pounds of waste material in 1000 gallons of water. As an example of the application of these ratios to waste material effluent streams, it has been found that with a typical waste stream from a poultry processing facility approximately 1 pound of chlorine is sufficient for treating approximately 1000 gallons of the waste material stream. It should be noted that since a reaction occurs only between the surface molecules of each waste material particle and the reagent, the amount of reagent required for effective coagulation and agglomeration is quite low when compared to prior art processes.

After the waste material has been removed from the effluent waste material stream, the remaining solution may be further treated to adjust its characteristics if such adjustment is desirable. The remaining solution, at optimum operation of the present process, contains very little dissolved chlorine or chlorine compounds and is generally suitable for discharge into rivers, lakes and by-waters without further treatment provided the original mineral content of the liquid component is acceptable.

An important and significant alternative embodiment of the present invention concerns the in situ formation of microbubbles of reagent by electrolysis rather than the preparation of a saturated metastable chlorine water solution. In this embodiment an anode and a cathode are appropriately positioned within the bottom portion of the dispersion tank of the previous embodiment. A salt solution of the reagent, such as sodium chloride, is fed into the bottom of the dispersion tank where electrolysis of the salt solution occurs. Microbubbles of chlorine gas form at the anode electrode of the system and are dispersed throughout the waste material media. Foraminous baffles 12 assist the dispersion of the microbubbles and establish a contact time between solids and bubbles during which the bubbles are selectively adsorbed upon the surfaces of the particulate waste material to selectively react with those surfaces and generate charged sites thereon. By controlling the current flow between electrodes, the volume and degree of microbubble formation may be easily and efficiently controlled. Of course, it is also contemplated that the salt solution of reagent may be electrolyzed outside of the dispersion tank and the electrolyzed water solution containing microbubbles of reagent may then be fed into the bottom of the dispersion tank.

An additional application of the present process concerns the processing of pulp, paper and pure cellulose from wood and wood chips. In conventional preparative procedures, the lignin present in the wood and wood chips is bleached in a costly and involved mechanical and chemical procedure which removes only a part of the lignin content. This step may be followed by the present process in a polishing operation wherein treatment of a solution of ground or comminuted wood or wood fibers with microbubbles of an oxidative reagent, such as chlorine, causes the agglomeration and coagulation of additional remaining lignin on the surfaces of the wood and wood fiber particles. The agglomerated and coagulated lignin may then be mechanically removed by conventional procedures. The process for formation of microbubbles of reagent may be by either the preparation of a saturated metastable reagent water solution as in the first embodiment, or by the electrolysis of a salt solution of reagent as in the alterantive embodiment. In either case, surface active cationic areas of flocculating agent are created on the lignin particles causing them to agglomerate and coagulate sufficiently for mechanical removal. The remaining wood, wood fibers and cellulose fibers are suitable for further processing.

The present invention is further illustrated by the following examples.

EXAMPLE 1

A liquid suspension of solid waste material from the waste line of a food packing company is centrifuged to remove the large easily separated particles. The remaining solution contains suspended particles constituting 0.3435% by weight of the suspension. A metastable 0.2% chlorine water solution is prepared and heated to a temperature of about 200° C. in an air-tight solution preparation tank by mixing chlorine gas with distilled water. The chlorine solution is then gradually pumped under 2 atmospheres of pressure into the bottom of a dispersion tank containing approximately 500 ml. of the waste solution at 20° C. Microbubbles of chlorine gas form within the dispersion tank and the waste material begins to agglomerate and coagulate as a precipitate soon thereafter. The waste solution is clear and is removed by decanting.

Little or no chlorine remains in the water as is determined by the following standard test: A sample of the decanted water is treated with concentrated ammonium hydroxide and then with concentrated nitric acid. The solution is then treated with silver nitrate to precipitate available chlorine as silver chloride. No appreciable precipitation of silver chloride is observed.

EXAMPLE 2

A quantity of paper mill waste is mixed with water to form a suspension and the larger particles separated therefrom, leaving a solution containing smaller particles. A 231 milliliter sample of the solution is found to have 0.27 gram of solids therein. A chlorine water solution is prepared and the sample of waste solution is treated therewith under the same conditions as in Example 1. A brown precipitate quickly forms at the bottom of the tank. The water remaining is found to be free of solids, and is found also to be free of chlorine by the test of Example 1.

EXAMPLE 3

A quantity of used motor oil is added to water and shaken sufficiently to form an emulsion. A 100 milliliter sample of the emulsion is found to have 0.129 gram of oil therein. A chlorine water solution is prepared as in Example 1 and used to treat the sample of the emulsion under conditions similar to those of Example 1. No oil remains in the water after a liquid material forms on the surface thereof, nor is any chlorine present in the water thereafter when tested as in Example 1.

EXAMPLE 4

A 100 ml. sample of dye waste solution including azo dyes, phenolphthalein, and methyl orange dye is found to have 0.0124 gram of solids therein. The sample is treated with a chlorine water solution under the same conditions as in Example 1. A white precipitate forms at the bottom of the dispersion tank. All visible solids are precipitated from the water and no chlorine remains as indicated by the test of Example 1.

EXAMPLE 5

A quantity of material is taken from a municipal sewage line and mixed with water to form a suspension. Several 100 milliliter samples are found to have an average of 0.1424 gram of solids therein. One sample of waste is treated with a chlorine solution prepared as in Example 1 under conditions similar to Example 1 and a grey precipitate forms at the bottom of the dispersion tank. No visible waste remains in the water, nor chlorine as tested for in Example 1.

EXAMPLE 6

A quantity of solvent waste comprising a mixture of ethyl alcohol, acetone and an ether of indefinite proportions is mixed with water and blended to form a solution. A 100 milliliter sample of the waste is found to have 0.1231 gram of waste material therein. A chlorine solution is prepared as in Example 1 and the sample of waste material is treated as in Example 1. A layer of liquid forms at the surface of the water while slowly rising globules of another liquid form in the water. Chlorine is absent from the water as tested for in Example 1.

EXAMPLE 7

A quantity of material is taken from a portion of rendering plant sediment and mixed with water to form a suspension. A 419.3 milliliter sample of the suspension is found to have 10.675 grams of solids therein. A chlorine solution, prepared as in Example 1, is used to treat the sample under conditions similar to those of Example 1. A greyish-brown precipitate forms at the bottom of the dispersion tank. No visible solids remain in the water. Chlorine is tested for as in Example 1 and found to be substantially absent.

EXAMPLE 8

A 100 milliliter sample of raw waste from a poultry packing plant is found to have 0.1922 gram of solids therein. The sample is treated with chlorine as in Example 1 under conditions similar to those of that Example and a dark precipitate forms at the bottom of the tank. All visible solids are removed and no chlorine remains, as tested for in Example 1.

EXAMPLE 9

A sample such as that treated in Example 8 is treated as in Example 8 with a metastable water solution of iodine which is adjusted to a temperature of about 200 degrees centigrade and a pressure of about two atmospheres. A precipitate forms very quickly and settles to the bottom of the dispersion tank.

EXAMPLE 10

A 100 milliliter sample of raw poultry waste as in Example 8 is treated as in Example 8 with a bromine solution previously heated to a temperature of about 200 degrees centigrade under a pressure of about two atmospheres. All visible solids are removed from the water and only a slight trace of bromine remains therein.

EXAMPLE 11

A 100 milliliter sample of raw poultry waste is found to have 0.06 gram of solids therein. The sample is treated as in Example 1 while at a temperature of about twenty degrees centigrade, with sulfur dioxide which has been adjusted to a temperature of about 250 degrees centigrade and a pressure of about two atmospheres until coagulation ceases. A greyish precipitate forms at the bottom of the water.

EXAMPLE 12

A suspension of one liter of water containing about 1000 parts per million of animal blood is placed in a desiccator equipped with a magnetic stirrer and the desiccator is evacuated to a pressure of 50 millimeters of mercury. Chlorine water is pumped under a pressure of 2 atmospheres through a capillary tube into the stirred waste at the rate of 100 milliliters per minute (corresponding to about 42.7 milligrams of solids per milligram of chlorine) for one minute. Evolution of microbubbles occurs and the greater amount of the solids is removed.

EXAMPLE 13

A five hundred milliliter sample of water is taken from the Arkansas River at Dardanelle, Ark., and is found to have 0.0823 gram of solids therein. The sample, while at a temperature of about 20 degrees centigrade, is treated as in Example 1 with chlorine gas which has been heated to a temperature of about 200° C. and a pressure of about two atmospheres until coagulation ceases. Precipitation occurs but some solids remain in the water.

0.1 gram of coagulated material from Example 7 is mixed with another sample as previously described. The sample is then treated with chlorine gas prepared according to the preceding paragraph while the sample is under the same conditions as to temperature. Good precipitation occurs and the chlorine gas treatment is stopped when precipitation ceases. The sample is found to be free of solids, including sand, mud and silt. Chlorine is found to be substantially absent from the water as tested for in Example 1.

EXAMPLE 14

A micro electrolysis cell consisting of a glass test tube body with a spiral platinum wire anode and a platinum foil cathode is prepared. 5 milligrams of salt are added in the cell to 20 ml. of a blood suspension containing 1000 p.p.m. total solids. The mixture is electrolyzed for 2 minutes with 15 milliamperes current and 12 volts across the cell. An evolution of very small microbubbles surrounding the anode electrode surfaces is noted during the electrolysis. After a few minutes, coagulation of the suspended matter occurs leaving a clear solution. No chlorine odor is detected.

Thus it may be seen that the present process provides a method for generation of surface active areas of cationic agglomerating agents on the surfaces of particulate waste material which is dissolved, suspended or dispersed in a liquid media. The formation of the areas of fluocculating agents on the waste material induces agglomeration and coagulation of the waste material within the liquid media.

While this invention has been described in detail with particular reference to preferred embodiments thereof, it will be understood that variations and modifications can be effected within the spirit and scope of the invention as described hereinbefore and as defined in the appended claims.

I claim:
1. Process for coagulating and agglomerating particulate material within a liquid media comprising preparing a chlorine water solution at a temperature of about 100° C. to about 700° C. and under a pressure in excess of the pressure upon the liquid media, introducing the chlorine water solution at substantially said temperature and pressure into the liquid media, generating microbubbles of chlorine gas within the liquid media, adsorbing the microbubbles of the chlorine gas on the surfaces of the particulate material, and reacting the chlorine gas with the particulate material at the points of adsorption.

2. Process of claim 1 wherein the chlorine gas is reacted with the surface molecules of the particulate material.

3. Process of claim 1 wherein the microbubbles range in size from about 3.72 angstrom units to about 0.1 mm. in diameter.

4. Process for coagulating and agglomerating particulate material within a liquid media comprising the steps of:
   Introducing into the liquid media a metastable solution containing a dissolved gas at a temperature of about 100° to about 700° C. and a pressure above that on the liquid media so that microbubbles of gas are formed within the liquid media;
   Adsorbing the microbubbles of gas on surfaces of the particulate material; and
   Reacting the gas with the particulate material at the points of adsorption to produce areas of surface characteristics which induce agglomeration and coagulation of the particulate material.

5. Process of claim 4 wherein the microbubbles of gas are of a diameter between about 3.72 angstrom units and 0.1 millimeters.

6. Process of claim 4 wherein the gas reacts with the surface molecules of the particulate material.

7. Process of claim 6 wherein the microbubbles are adsorbed on less than the total surface area of the particulate material and reaction between the surface molecules of the particulate material and the gas occurs only in the areas of adsorption.

8. Process of claim 4 wherein the gas is selected from the group consisting of compounds and compositions which may be spontaneously released from a liquid solution as a gas to become attracted to a particulate surface in a liquid media.

9. Process of claim 4 wherein the gas is selected from the group consisting of hydrogen sulfide, carbon dioxide, sulfur dioxide, ozone and halogens.

10. Process of claim 4 wherein the gas is chlorine.

11. Process of claim 4 wherein the metastable solution is prepared by electrolyzing a solution containing a dissolved salt, said solution being at a temperature of about 100° C. to 700° C. and a pressure above the pressure on the liquid media.

12. Process of claim 4 wherein coagulated and agglomerated material is extracted from the liquid media.

13. Coagulated and agglomerated material for use as a surface active flocculating agent prepared by the process of claim 12.

14. Process of claim 14 wherein the metastable solution as at a temperature of about 200° C. and a pressure of about two atmospheres when introduced into the liquid media.

15. Process for coagulating and agglomerating particulate material within a liquid media comprising the steps of:
introducing a solution containing a dissolved gas into the liquid media under a pressure in excess of the pressure on the liquid media and at a temperature of from about 100° to about 700° C. so that microbubbles of the gas form within the liquid media, said microbubbles being of a diameter between about 3.72 angstrom units and 0.1 millimeters;
adsorbing the microbubbles of gas on areas of the surfaces of the particulate material, said areas of surface constituting less than the total surface area of the particulate material;
reacting the gas with the surface molecules of the particulate material at the points of adsorption to produce areas of surface characteristics which induce agglomeration and coagulation of the particulate material.

References Cited

UNITED STATES PATENTS

| | | | |
|---|---|---|---|
| Re. 26,329 | 1/1958 | Hougen | 204—149 |
| 362,657 | 5/1887 | Powers | 210—192 |
| 1,483,256 | 2/1924 | Van Meter | 210—62X |
| 1,946,818 | 2/1934 | Stevenson | 210—62X |
| 1,956,463 | 4/1934 | Lyon | 210—62X |
| 1,995,914 | 3/1935 | Baker et al. | 210—62 |
| 2,070,285 | 2/1937 | Lissaver et al. | 210—62X |
| 2,771,416 | 11/1956 | Ryan | 210—192X |
| 1,672,587 | 6/1928 | Travers | 210—43 |
| 1,746,964 | 2/1930 | Polatsik | 204—149X |
| 2,766,203 | 10/1956 | Brown et al. | 210—62X |

OTHER REFERENCES

Van Kleeck, L. W., The Fundamentals of Sewage Chlorination, Wallace & Tiernan Inc., reprint from Wastes Engineering, June 1956, 4 pages.

MICHAEL ROGERS, Primary Examiner

U.S. Cl. X.R.

204—149; 210—50, 62; 252—175